(12) United States Patent
Lu et al.

(10) Patent No.: US 6,568,957 B1
(45) Date of Patent: May 27, 2003

(54) COUPLING ASSEMBLY

(75) Inventors: Lien-Wan Lu, Tao-Yuan Hsien (TW); Hiroshi Abe, Yokohama (JP)

(73) Assignee: Tai-Sol Electronics Co., Ltd (TW)

( * ) Notice: Subject to any disclaimer, the term of this patent is extended or adjusted under 35 U.S.C. 154(b) by 0 days.

(21) Appl. No.: 09/679,572

(22) Filed: Oct. 5, 2000

(51) Int. Cl.$^7$ .............................................. H01R 13/60
(52) U.S. Cl. ................................................... 439/541.5
(58) Field of Search ............................... 439/74, 541.5, 439/64, 101, 108, 607

(56) References Cited

U.S. PATENT DOCUMENTS 5,636,999 A * 6/1997 Hirai et al. ............... 439/541.5
5,775,923 A * 7/1998 Tomioka ................... 439/541.5
6,062,904 A * 5/2000 Oguchi et al. ............ 439/541.5

* cited by examiner

Primary Examiner—Gary Paumen
(74) Attorney, Agent, or Firm—Ostrolenk, Faber, Gerb & Soffen, LLP

(57) ABSTRACT

A coupling assembly for plugging and conductively jointing an interface card with an external circuit board comprises a plastic housing including a ground piece, a plurality of conductive pins, and an adapter circuit board, wherein the ground piece and the plurality of conductive pins are disposed in the adapter circuit board while a plurality of outward connecting pins is disposed under the adapter circuit board for conductively jointing the ground piece and the conductive pins with the outward connecting pins.

3 Claims, 6 Drawing Sheets

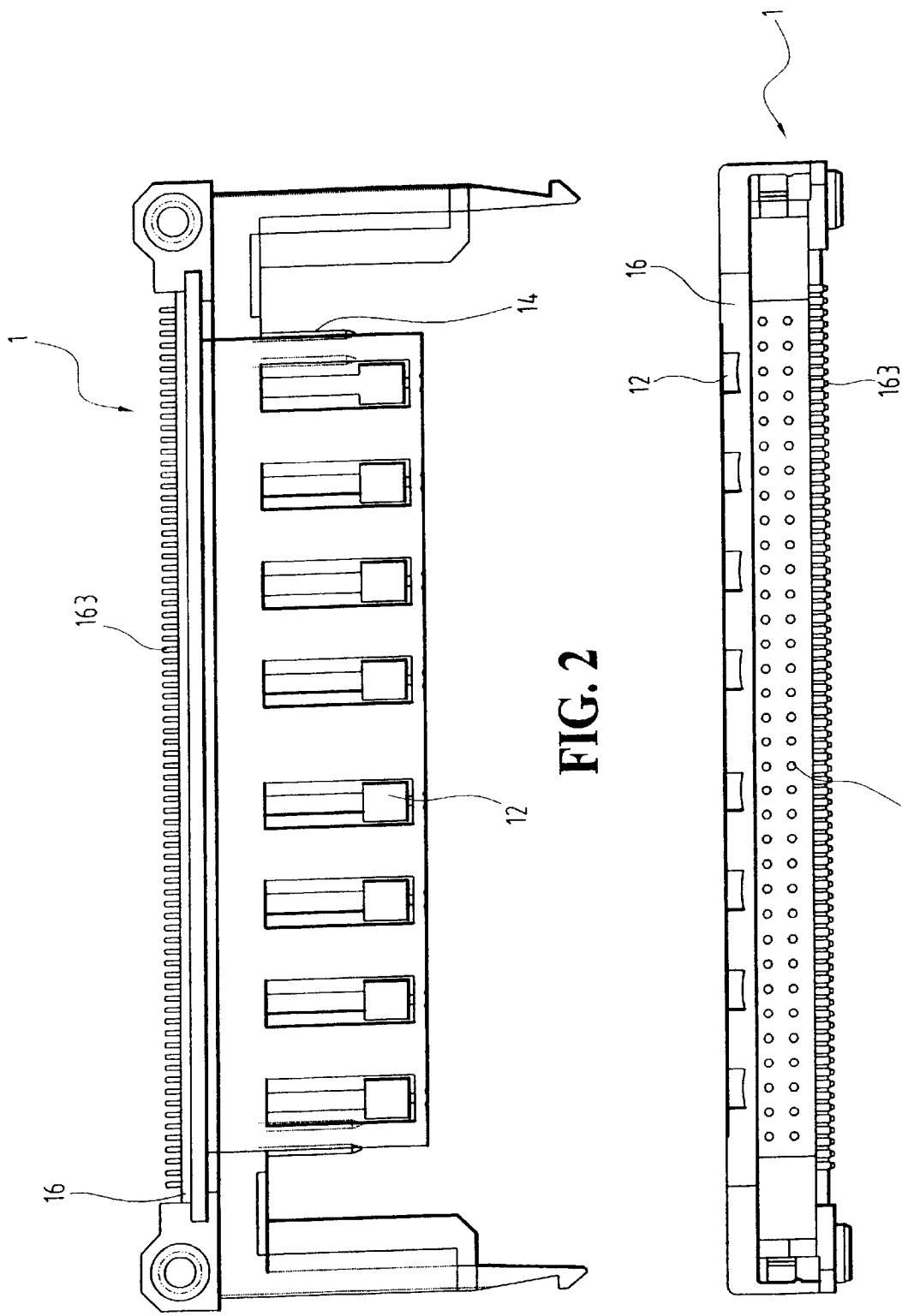

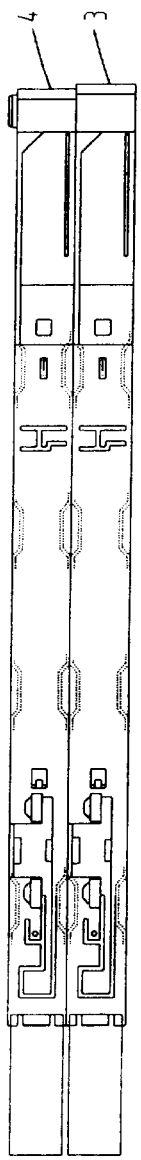
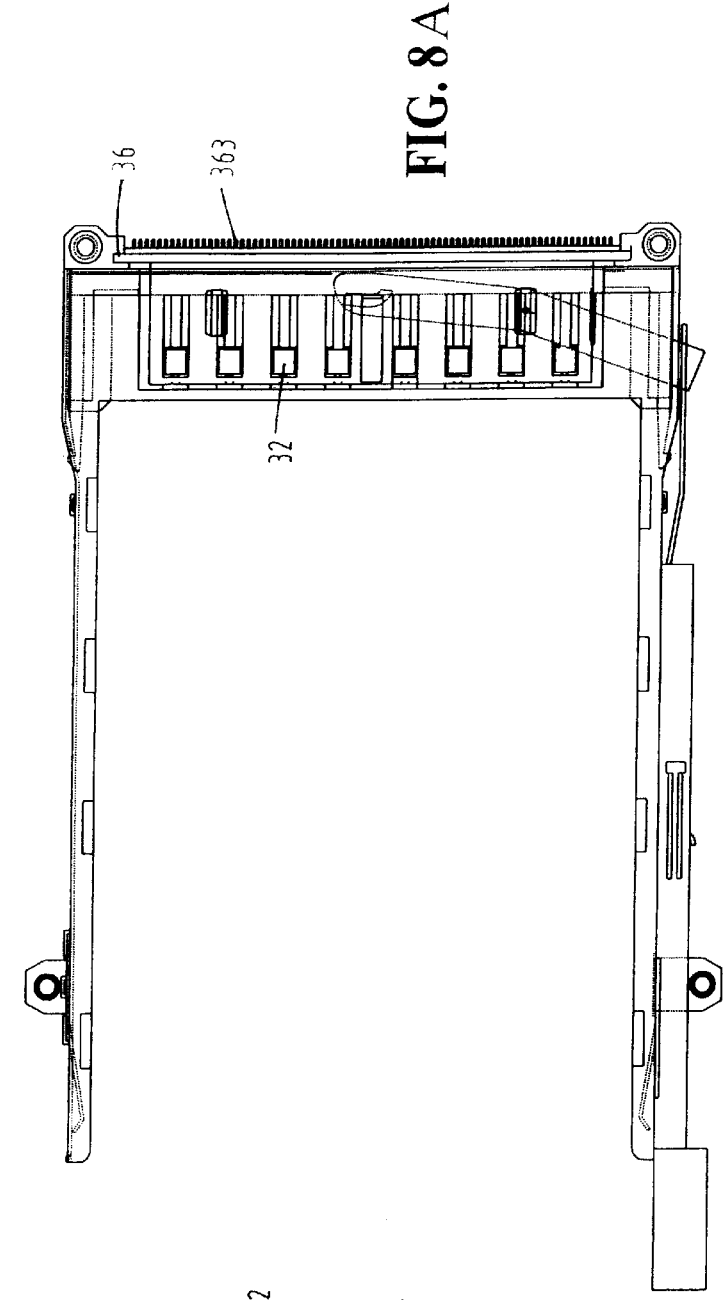
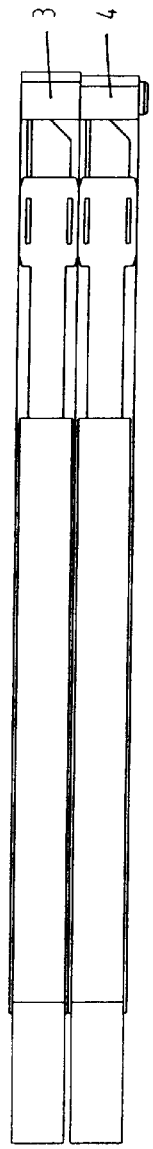
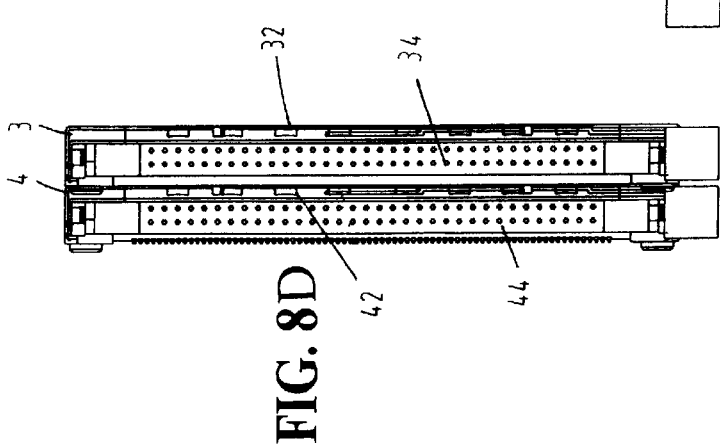
FIG. 8A
FIG. 8B
FIG. 8C
FIG. 8D

COUPLING ASSEMBLY

BACKGROUND OF THE INVENTION

1. Field of the Invention

This invention relates generally to connectors, more particularly, it relates to a coupling assembly for conductive connection with a ground piece and a plurality of metallic pins via an adapter circuit board.

2. Description of the Prior Art

A conventional coupling assembly generally comprises a casing, a plurality of metallic pins, and a ground piece, wherein the metallic pins and the ground piece are usually disposed at a top or front end of the coupling assembly individually, hence, the metallic pins and the ground piece are connected .with an external circuit board either by soldering respectively or via a relay circuit. However, such a coupling assembly is found defective in the following:

1. As the metallic pins are formed directly in lack of support, alignment can be hardly controlled to result in poor soldering.
2. Poor contact of the relay circuit will happen over time.

SUMMARY OF THE INVENTION

The primary object of this invention is to provide a coupling assembly that interconnects a ground piece and a plurality of metallic pins to an adapter circuit board, which is further provided with a plurality of outward connecting pins thereunder for conductively joining to an external circuit board.

In order to realize abovesaid object, a coupling assembly of this invention mainly contains a plastic housing including an adapter circuit board having a ground piece and a plurality of conductive pins disposed therein and a plurality of outward connecting pins disposed thereunder for conductivity joining to an external circuit board.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which:

FIG. 2 is a top view of the first embodiment of this invention;

FIG. 3 is a front view of the first embodiment of this invention;

FIG. 8A is a top view of an assembled coupling assembly in accordance with the second embodiment of this invention;

FIG. 8B is one side view of the assembled coupling assembly of FIG. 8A;

FIG. 8C is another side view of the assembled coupling assembly of FIG. 8A;

FIG. 8D is a front view of the assembled coupling assembly of FIG. 8A

DETAILED DESCRIPTION OF THE PREFERRED EMBODIMENT

Figure 1:
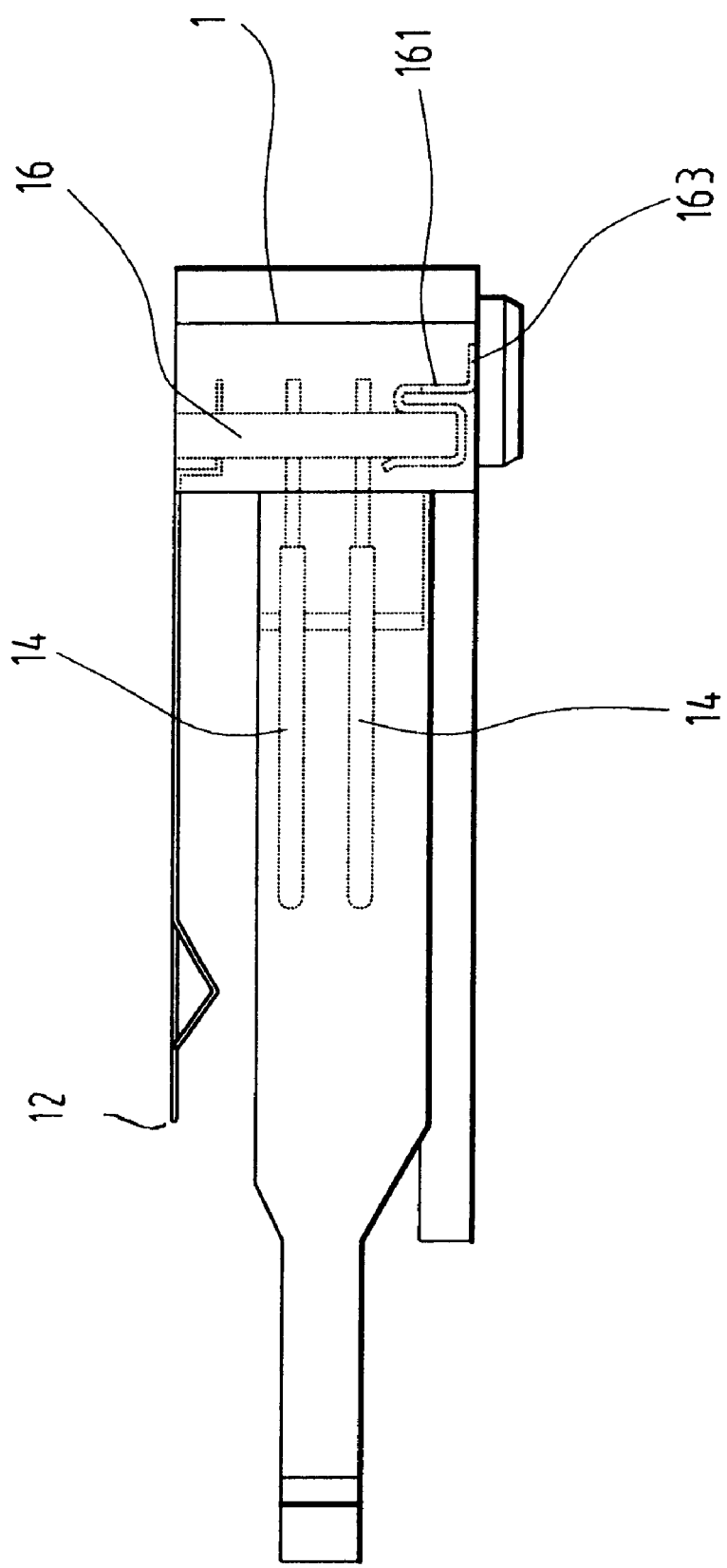
FIG. 1 is a side view of a first embodiment of this invention.
Figure 4B:
FIG. 4B is one side view of the assembled coupling assembly of FIG. 4A.
Figure 4A:
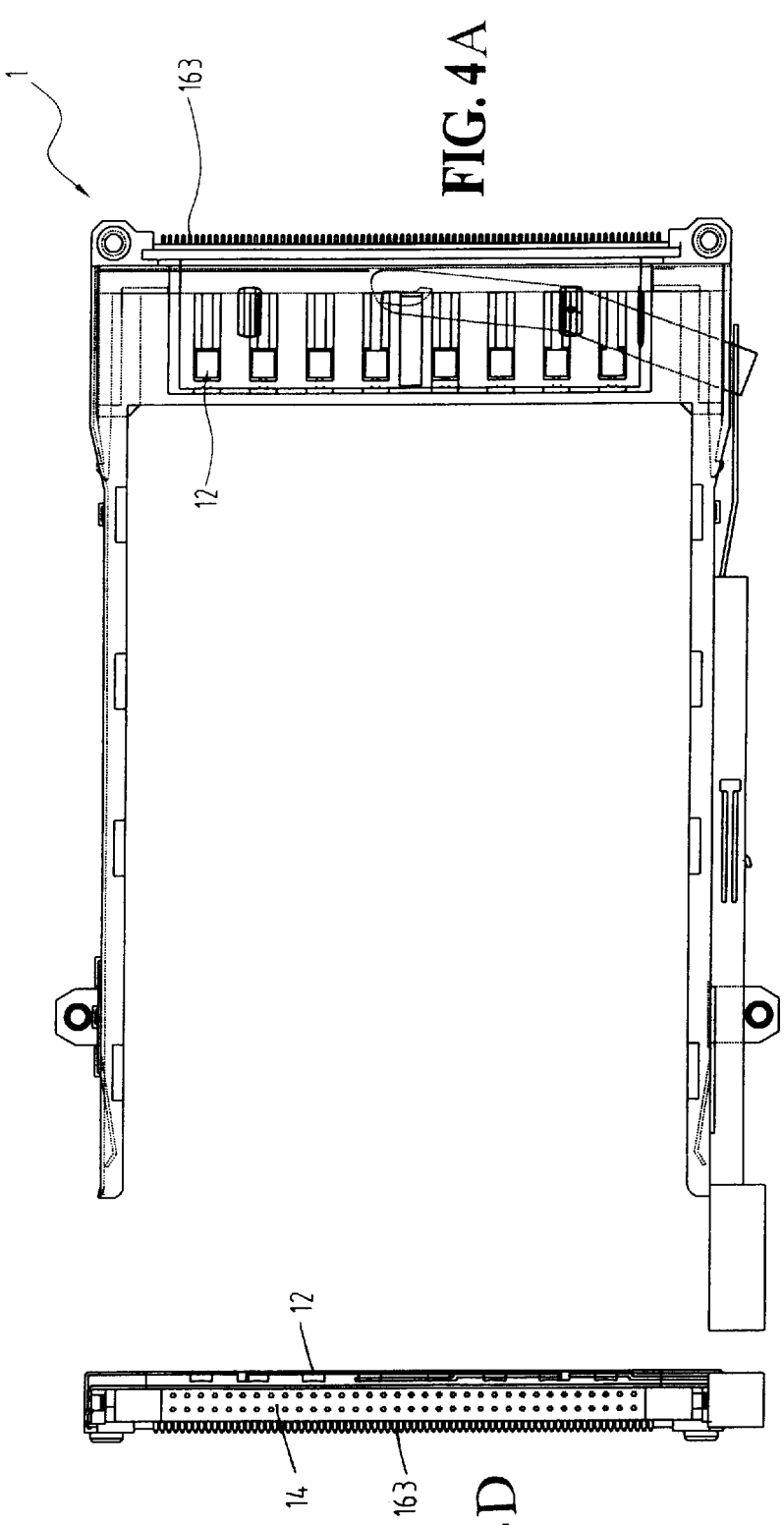
FIG. 4A is a top view of an assembled coupling assembly in accordance with the first embodiment of this invention.
Figure 4C:
FIG. 4C is another side view of the assembled coupling assembly of FIG. 4A.
Figure 4D:
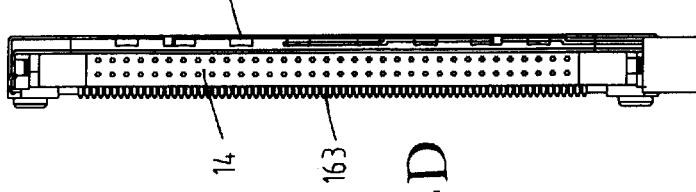
FIG. 4D is a front view of the assembled coupling assembly of FIG. 4A.

As shown in FIGS. 1 through 3, a coupling assembly of a first embodiment of this invention comprises a plastic housing 1 including a ground piece 12, a plurality of conductive pins 14, and an adapter circuit board 16, wherein the ground piece 12 and the plurality of conductive pins 14 are disposed in the adapter circuit board 16, and a plurality of outward connecting pins 161 is disposed under the adapter circuit board 16 for conductively joining with an external circuit board.

The ground piece 12 and the plurality of conductive pins 14 are penetratingly soldered at the adapter circuit board 16 while the tail end of the outward connecting pins 161 are bent into Surface Mounting Type (SMT) terminals 163 soldered on an external circuit board.

FIGS. 4A–4D illustrate an overall assembled view of the first embodiment of this invention.

Figure 5:
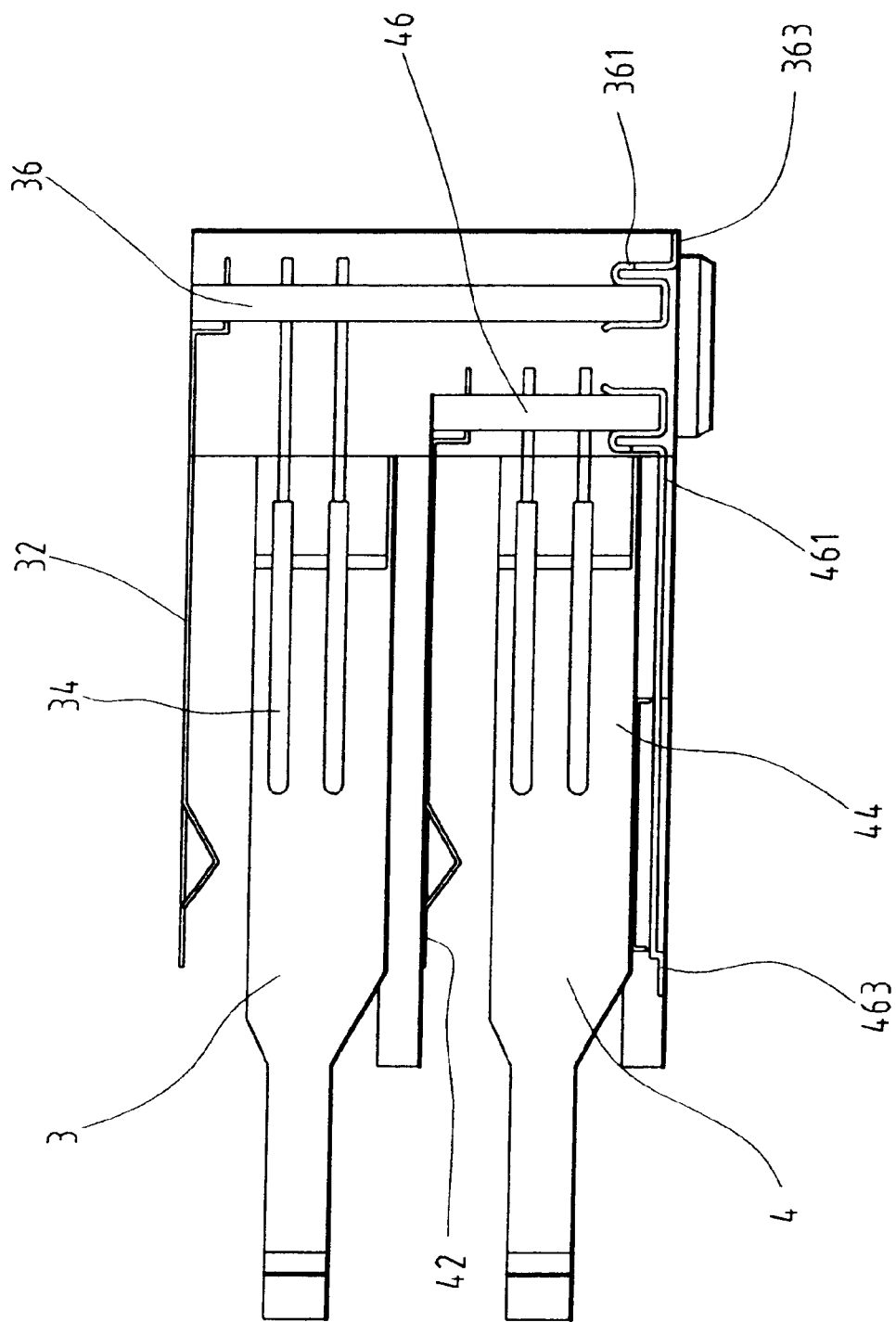
FIG. 5 is a side view of a second embodiment of this invention.
Figure 6:
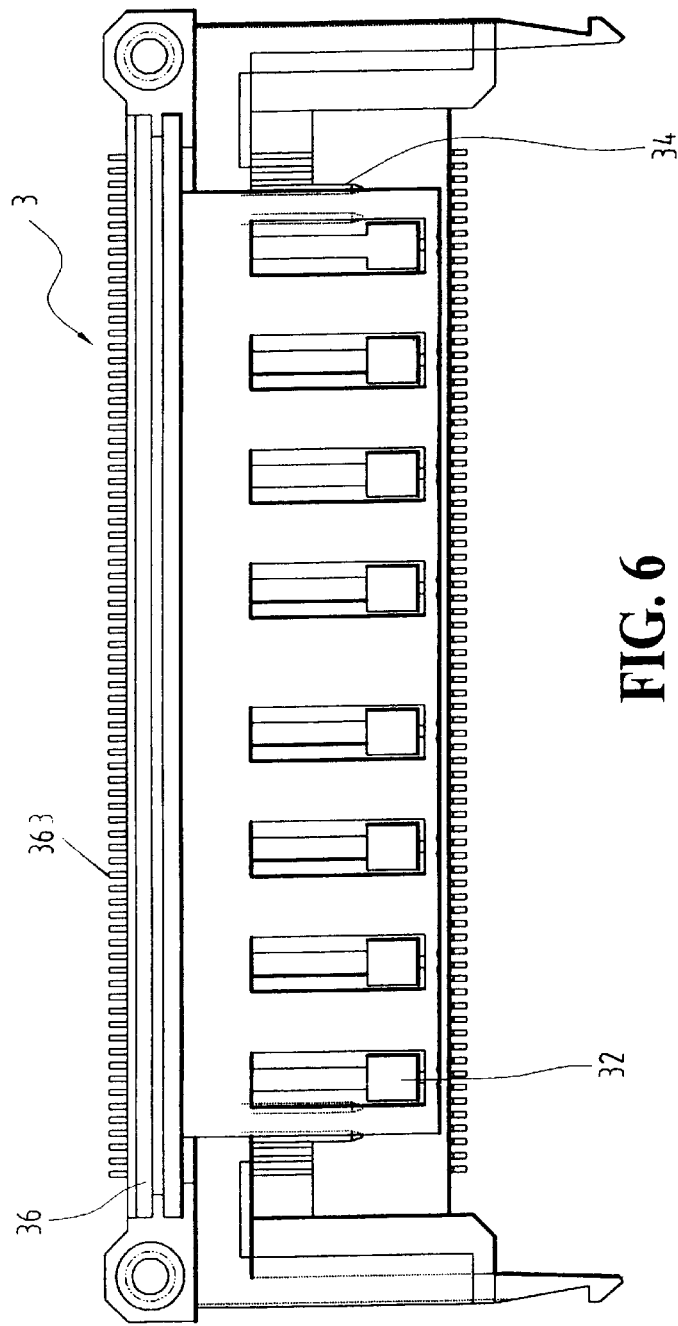
FIG. 6 is a top view of the second embodiment of this invention.
Figure 7:
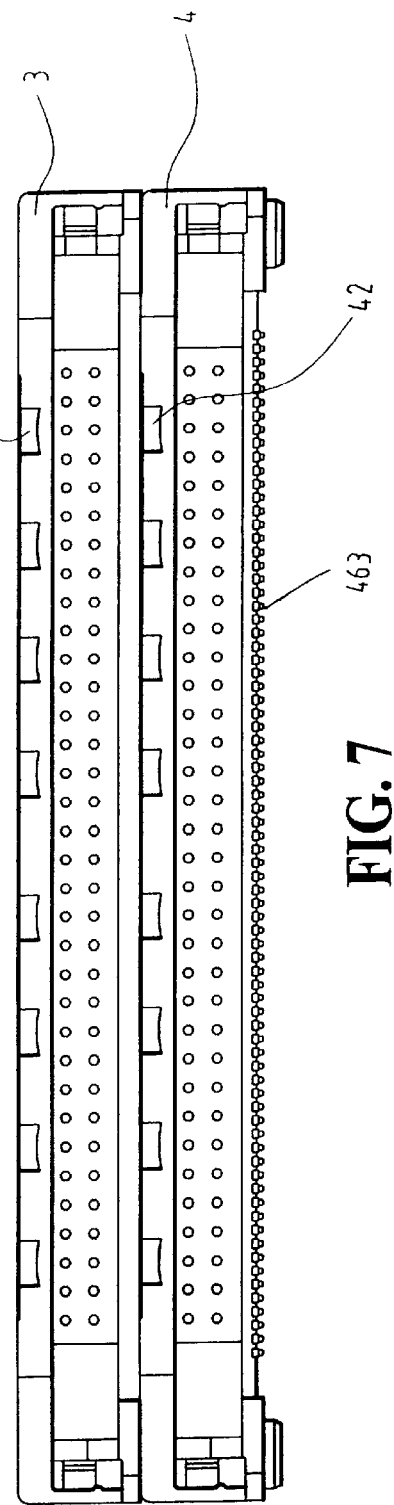
FIG. 7 is a front view of the second embodiment of this invention.

In a second embodiment of this invention shown in FIGS. 5 through 7, a coupling assembly of this invention comprises an upper and a lower plastic housing 3, 4 including a ground piece 32, 42, a plurality of conductive pins 34, 44, an adapter circuit board 36, 46 disposed therein, and a plurality of outward connecting pins 361, 461 disposed thereunder, wherein the ground piece 32, 42 and the plurality of conductive pins 34, 44 are plugged and fixed at the adapter circuit board 36, 46, and the outward connecting pins 361, 461 are provided for jointing externally.

The ground piece 32, 42 and the plurality of conductive pins 34, 44 are penetratingly soldered at the adapter circuit board 36, 46 while the tail end of the outward connecting pins 361, 461 are bent into Surface Mounting Tape (SMT) terminals 363, 463 soldered on an external circuit board.

FIGS. 8A–8D illustrate an overall assembled view of the second embodiment of this invention.

In short, this invention is to eliminate defects of a prior technique by housing a ground piece and a plurality of conductive pins at an adapter circuit board and having a plurality of outward connecting pins directly soldered in SMT style on an external circuit board instead of soldering the ground piece and the conductive pins on the external circuit board respectively, or connecting via a relay circuit board.

In the above described, at least one preferred embodiment has been elucidated with reference to drawings annexed, it is apparent that numerous variations or modifications may be made without departing from the true spirit and scope thereof, as set forth in the claims below.

What is claimed is:

1. A coupling assembly for plugging and conductively joining an interface card with an external circuit board, the coupling assembly comprising:

a plastic pin housing, an adapter circuit board positioned in the housing, the adapter circuit board having an edge, a ground piece disposed on the adapter circuit board, a plurality of conductive pins included in the plastic pin housing and disposed in the adapter circuit board, and a plurality of outward connecting pins provided as surface mounting terminals fixedly secured to the edge of the adapter circuit board for surface mounting the adapter circuit board to the external circuit board by way of soldered contacts between terminal ends of the surface mounting terminals and the external circuit board.

2. The coupling assembly of claim 1, wherein the outward connecting pins provided as surface mounting terminals are adapted to be soldered directly to the external circuit board.

3. The coupling assembly of claim 1, wherein each of the outward connecting pins has a tail end that is bent into a surface mounting type terminal.

* * * * *